US005624346A

United States Patent [19]
Hirota

[11] Patent Number: 5,624,346
[45] Date of Patent: Apr. 29, 1997

[54] DIFFERENTIAL GEAR

[75] Inventor: Isao Hirota, Tochigi-ken, Japan

[73] Assignee: Tochigi Fuji Sangyo Kabushiki Kaisha, Tochigi-ken, Japan

[21] Appl. No.: 492,636

[22] Filed: Jun. 20, 1995

[30] Foreign Application Priority Data

Jun. 23, 1994 [JP] Japan ..................... 6-141461
Mar. 27, 1995 [JP] Japan ..................... 7-067701

[51] Int. Cl.⁶ .............. F16H 48/00; F16H 48/20
[52] U.S. Cl. ............................................. 475/249
[58] Field of Search ........................... 475/249, 252

[56] References Cited

U.S. PATENT DOCUMENTS

| | | |
|---|---|---|
| 1,195,314 | 8/1916 | Williams . |
| 1,373,657 | 4/1921 | Finefrock . |
| 2,000,223 | 5/1935 | Du Pras . |
| 2,269,734 | 1/1942 | Powell . |
| 2,462,000 | 2/1949 | Randall . |
| 2,789,446 | 4/1957 | Schoenrock . |
| 2,900,846 | 8/1959 | Lehman . |
| 2,972,265 | 2/1961 | Walter . |
| 3,095,761 | 7/1963 | Hilado . |
| 3,251,244 | 5/1966 | Nickell . |
| 3,292,456 | 12/1966 | Saari . |
| 3,406,593 | 10/1968 | Vesey . |
| 3,706,239 | 12/1972 | Myers . |
| 3,738,192 | 6/1973 | Belansky . |
| 4,365,524 | 12/1982 | Dissett et al. . |
| 4,677,876 | 7/1987 | Dissett . |
| 4,751,853 | 6/1988 | Dissett . |
| 4,781,078 | 11/1988 | Blessing et al. ............... 475/249 |
| 4,916,978 | 4/1990 | Razelli et al. . |
| 5,055,096 | 10/1991 | Riemschied et al. . |
| 5,122,101 | 6/1992 | Tseng . |
| 5,169,370 | 12/1992 | Dye et al. . |
| 5,217,416 | 6/1993 | Dick .................................. 475/249 |
| 5,232,416 | 8/1993 | Amborn et al. . |
| 5,244,440 | 9/1993 | Ichiki et al. . |
| 5,292,291 | 3/1994 | Ostertag . |
| 5,302,159 | 4/1994 | Dye et al. . |
| 5,310,389 | 5/1994 | Sato . |
| 5,320,586 | 6/1994 | Baxter, Jr. ..................... 475/249 |
| 5,326,333 | 7/1994 | Niizawa et al. .............. 475/249 |
| 5,346,443 | 9/1994 | Crysler et al. . |
| 5,366,422 | 11/1994 | Dye et al. . |
| 5,415,598 | 5/1995 | Sawase et al. ............... 475/249 |
| 5,458,547 | 10/1995 | Teroka et al. ................ 475/249 |

FOREIGN PATENT DOCUMENTS

| | | |
|---|---|---|
| 0130806 | 1/1985 | European Pat. Off. . |
| 0356401 | 2/1990 | European Pat. Off. . |
| 899549 | 8/1944 | France . |
| 951431 | 4/1949 | France . |
| 2256350 | 7/1975 | France . |
| 2566080 | 12/1985 | France . |
| 4013200 | 10/1991 | Germany . |
| 4013196 | 10/1991 | Germany . |

(List continued on next page.)

OTHER PUBLICATIONS

English Language Abstract of Japanese Patent Publication 63-78746 May 1988.
English Language Abstract of Japanese Patent Publication 62-172842 Nov. 1987.
English Language Abstract of Japanese Patent Publication 3-239634 Oct. 1991.

*Primary Examiner*—Dirk Wright
*Attorney, Agent, or Firm*—Greenblum & Bernstein P.L.C.

[57] ABSTRACT

A differential gear, adapted to be driven by an engine, includes a differential gear case, helical pinion gears which are housed slidably and rotatably in housing holes formed in the differential gear case, and helical side gears on wheels coupled via the helical pinion gears. The differential gear further includes a limit slip differential of the speed-responsive type, in which a member on one side is coupled to one of the side gears. A spur gear portion is formed on a member on the other side of the limited slip differential, and the spur gear portion meshes with a spur gear formed on the other helical pinion gear to mesh with the other helical side gear.

19 Claims, 8 Drawing Sheets

FOREIGN PATENT DOCUMENTS

| | | |
|---|---|---|
| 5997346 | 6/1984 | Japan . |
| 62-172842 | 11/1987 | Japan . |
| 63-78746 | 5/1988 | Japan . |
| 3-239634 | 10/1991 | Japan . |
| 237300 | 8/1945 | Switzerland . |
| 27123 | 4/1912 | United Kingdom . |
| 2234791 | 2/1991 | United Kingdom . |

DIFFERENTIAL GEAR

BACKGROUND OF THE INVENTION

1. Field of the Invention

The present invention relates to a differential gear used for vehicles.

2. Description of the Prior Art

There are disclosed differential gears 301 and 303 and a driving power transmission device 305, respectively, as shown in FIGS. 1, 2 and 3 in Japanese Laid-Open Utility Model Publication No. 63-78746, Japanese Laid-Open Utility Model Publication No. 62-172842, and Japanese Laid-Open Patent Publication No. 3-239634.

Differential gears 301 and 303 include, respectively, bevel gear-type differential gear mechanisms 307 and 309, viscous couplings 311 and 313, and multiple disc clutches 315 and 317, and the driving power transmission device 305 includes a worm gear-type differential gear mechanism 319 and a viscous coupling 321.

Viscous couplings 311, 313 and 321 are speed-responsive type limit slip differentials in which the differential restriction power becomes large as the differential rotation speed becomes large. Also, the multiple disc clutches 315 and 317 are torque-responsive type limit slip differentials which are clamped by a reaction force in the action of differential gear mechanisms 307 and 309.

Furthermore, the differential gear mechanism 319 obtains the differential restriction function of the torque-responsive type by the torque transfer loss caused by the friction of the acting portion of the worm gear.

The multiple disc clutch 315 of the differential gear 301 is a S-H type differential gear (S: shaft, H: housing) arranged between a hub 323 on the shaft side and a differential gear case 325 (housing). And the viscous coupling 311 is a S-S type coupling arranged between hubs 323 and 327 on the shaft side. And each of the multiple disc cluch 317 and the viscous coupling 313 of the differential gear 303, and the viscous coupling 321 of the driving force transmission device 305 is S-H type.

In the case where the differential restriction mechanism is arranged in S-S, even if either wheel on the shaft side (on the side of a side gear) runs idle, uniform differential restriction force can be obtained. In the case of S-H arrangement, however, since the direction of the differential rotation is reversed by the differential gear mechanism to decrease the differential rotation number which is input to the limit slip differential, when the differential movement is input to the differential restriction mechanism via the differential gear mechanism due to the racing of the wheel on the one side, the wheel on the other side runs idle, and the differential restriction force becomes smaller than in the case where the differential movement is input directly to the limit slip differential. Therefore, there is caused a difference in the differential restriction force by the fact which wheel runs idle, and the differential restriction property becomes unequal.

As described above, in the differential gear 303, both of the limit slip differential of the speed-responsive type (viscous coupling 313) and the differential restriction mechanism of the torque-responsive type (multiple disc clutch 317) are the S-H type. In the differential gear 301, the differential restriction mechanism of the torque-responsive type (multiple disc clutch 315) is also the S-H type, and in the driving force transmission device 305, the differential restriction mechanism of the speed-responsive type (viscous coupling 321) is the S-H type. Thus, there has conventionally been no differential gear having uniform differential restriction property in combination with the differential restriction function of the speed-responsive type and the differential restriction function of the torque-sensitive type.

Furthermore, in order to arrange the viscous coupling 311 in S-S in the differential gear 301, the one shaft 329 has to be made longer than the other shaft 331, which makes the length of the two shafts unequal.

Furthermore, in the differential gear 301, since a stepped portion 333 is formed in the hub 327, there is a case where a differential gear to be incorporated cannot be incorporated due to the size or the shape of the differential gear case. Accordingly, the materialization is restricted, thereby the differential gear is not adaptable in the wide range to various types of vehicles.

SUMMARY OF THE INVENTION

The object of the present invention, therefore, is to provide a differential gear having differential restriction functions of the speed-responsive type and the torque-responsive type, which can obtain uniform differential restriction property even if either wheel runs idle, which can make the length of the shafts equal and which is adaptable to wide range of vehicles.

The differential gear of claim 1 includes a differential gear case which is rotated and driven by a driving force of an engine, pinion gears which are housed slidably and rotatably in housing holes formed in the differential gear case, a pair of side gears on wheels coupled via the pinion gear, and a differential restriction mechanism of the speed-responsive type which is coupled to these side gears via the pinion gears.

The differential gear of claim 2 includes a differential gear case which is rotated and driven by a driving force of an engine, a first and a second pinion gears which are housed slidably and rotatably in housing holes formed in the differential gear case and mesh with each other directly or via an idle gear, a pair of side gears on wheels coupled via these pinion gears, and a limit slip differential of the speed-responsive type in which a member on one side is coupled to the one side gear and a member on the other side meshes with the other side gear.

The differential gear of claim 3 includes a differential gear case which is rotated and driven by a driving force of an engine, a first and a second pinion gears which are housed slidably and rotatably in housing holes formed in the differential gear case and mesh with each other directly or via an idle gear, a pair of side gears on wheels coupled via these pinion gears, and a limit slip differential of the speed-responsive type in which a member on one side meshes with the first pinion gear and a member on the other side meshes with the second pinion gear.

The differential gear of claim 4 is a differential gear according to claim 2, wherein the member on the other side is arranged on the outside in the radial direction of the member on one side, and a mesh portion for engagement with the other side member is formed on the pinion gear.

The differential gear of claim 5 is a differential gear according to claim 4, wherein the mesh portion is a spur gear.

The differential gear of claim 6 is a differential gear according to claim 2, wherein the member on the other side is arranged on the outside in the radial direction of the member on one side, and the second pinion gear meshes directly with the mesh portion of the other side member.

The differential gear of claim 7 is a differential gear according to claim 1, wherein the member on one side of the speed-responsive type differential restriction mechanism is formed integrally with the one side gear, and the internal gear provided on the member on the other side meshes with the pinion gear which meshes with the one side gear.

The differential gear of claim 8 is a differential gear according to claim 1, wherein the side gears and the pinion gears are composed of helical gears.

In the differential gears of claim 1, the pinion gear is pushed to the housing hole by the reaction force in the action with the side gear to cause the friction resistance. Furthermore, in the differential gear of claim 8, there is caused the friction resistance between each gear and the differential gear case, and side gears due to the acting thrust power of the helical gear, in addition to the acting reaction force. By these friction resitance, there can be obtained the torque-responsive type differential restriction function of the S-S type which works between side gears and obtains uniform property. In addition, the speed-responsive type limit slip differential is coupled to both side gears via the pinion gears, and works between side gears, thereby this is also the S-S type. Thus, uniform differential restriction property can be obtained in combination with the differential restriction functions of both the torque-responsive type and the speed-sensitive type.

Furthermore, since pinion gears are used to couple the speed-responsive type limit slip differential and both side gears, there is no need to make the length of the shaft unequal in order to arrange the speed-responsive type limit slip differential in S-S, differing from the conventional differential gear 301.

Furthermore, in the differential gear of claim 3, since the speed-responsive type differential restriction mechanism is unitized by meshing the member on one side and the member on the other side of the speed-responsive type limit slip differential with the pinion gears on the different side gear side, assembly to the differential mechanism portion is facilitated, and the man-hour for the assembly can be reduced.

In the differential gear of claim 7, the member on one side of the speed-responsive type differential restriction mechanism is formed integrally with the one side gear, while forming the internal gear on the memeber on the other side, and the internal gear is meshed with the pinion gear on the outside in the radial direction of said pinion gear on the one side gear.

Thus, since the speed-responsive type differential restriction mechanism as well as the one side gear is unitized, the assembly to the differential mechanism portion is facilitated and the man-hour for the assembly can be reduced, as in the structure of claim 3. In addition, a pair of seals for preventing the flow of the viscous fluid which are disposed between the member on the one side and the member on the other side can be made to have the equal diameter, by integrally forming the member on the one side and the one side gear, and by making these members common, the cost can be further reduced.

Furthermore, in the structure of each claim, by using the differential mechanism having the structure of coupling the side gears with the pinion gears disposed axially, as described above, each gear as well as the coupling portion with the speed-responsive type differential restriction mechanism can be made in a straight form, not in a stepped form, while arranging the differential restriction functions of the torque-responsive type and the speed-responsive type in S-S, thereby the production cost of pinion gears and side gears can be reduced, and the assembly of them are facilitated and the man-hour for the assembly can be reduced.

Furthermore, by coupling the member on the one side of the speed-responsive type differential restriction mechanism with the hub of the side gear, or by forming the member on the one side integrally with the side gear, there is no need to form a stepped portion 333 on the hub, thereby the materialization of the differential gear is increased in the assembly of the speed-responsive type limit slip differential, the differential gear can be made widely adaptable for different types of vehicles.

BRIEF DESCRIPTION OF THE INVENTION

DESCRIPTION OF THE PREFERRED EMBODIMENTS

Figure 1:
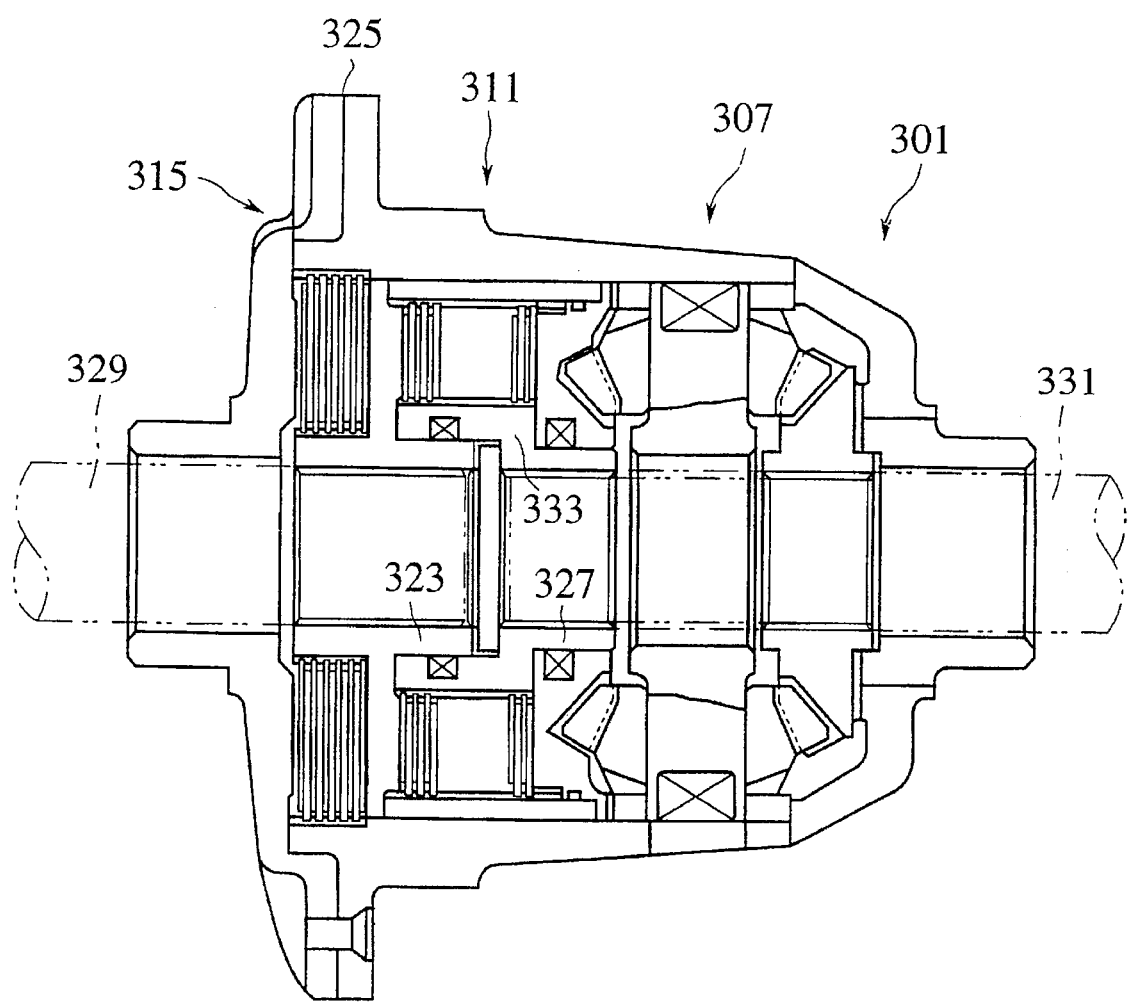
FIG. 1 is a sectional view of the first embodiment conventionally used.
Figure 2:
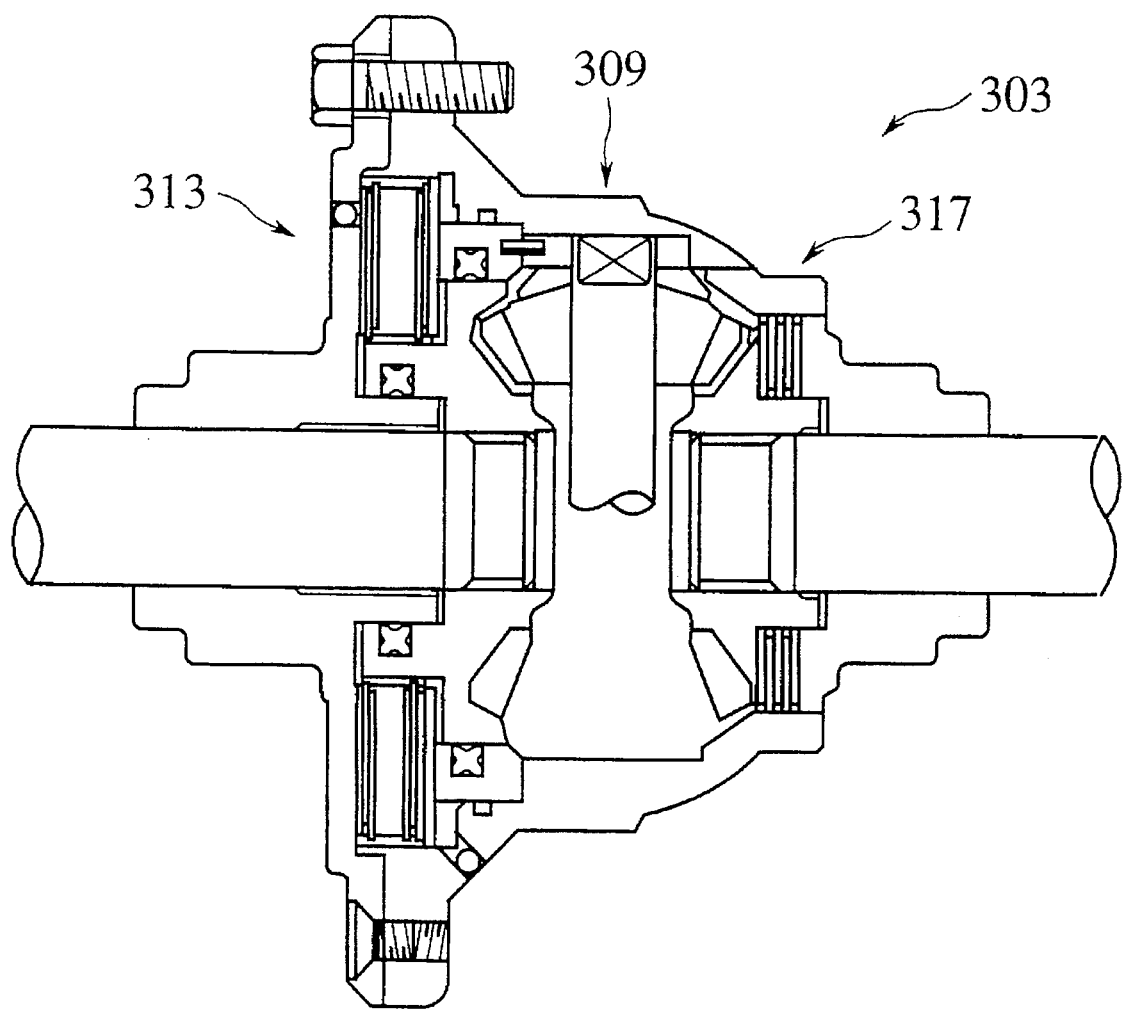
FIG. 2 is a sectional view of the second embodiment conventionally used.
Figure 3:
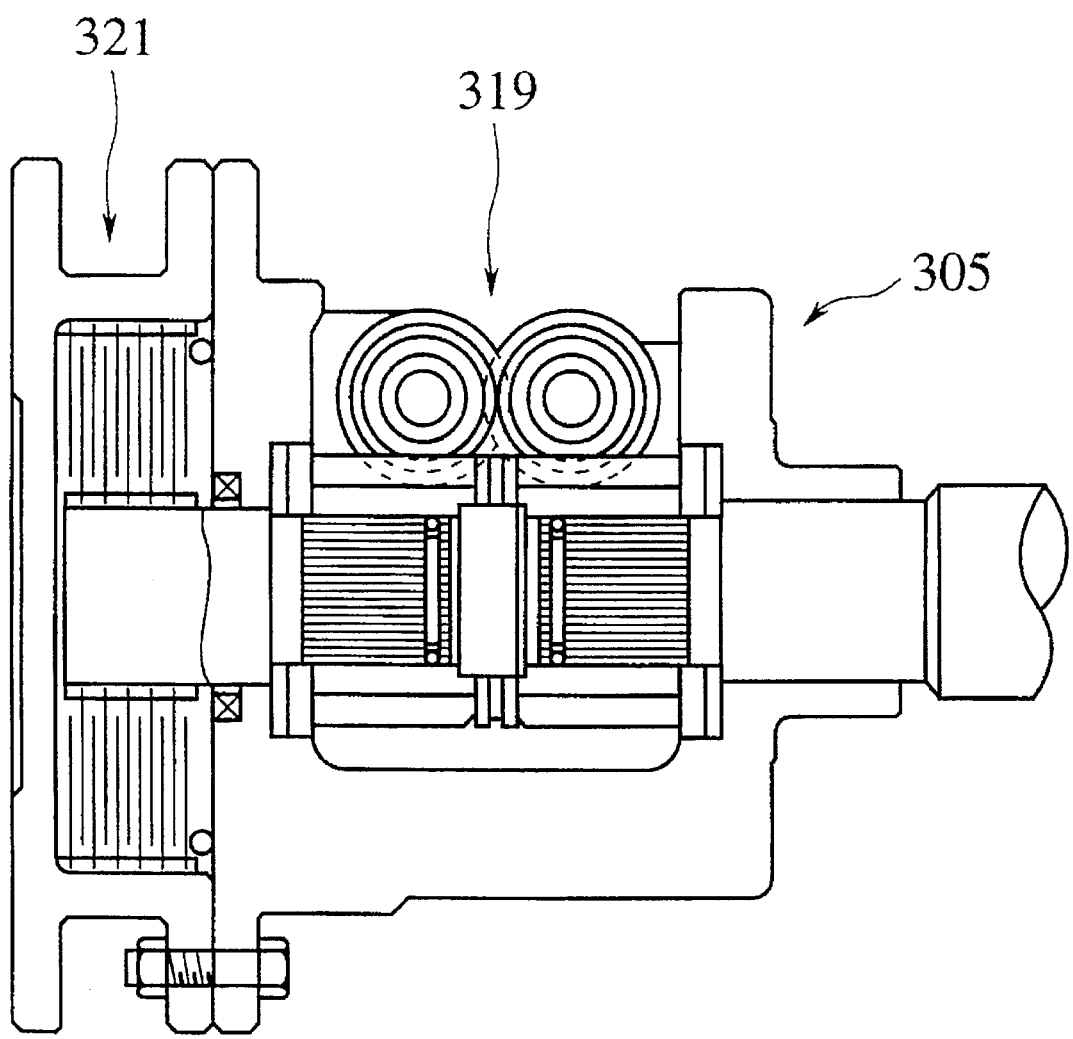
FIG. 3 is a sectional view of the third embodiment conventionally used.
Figure 4:
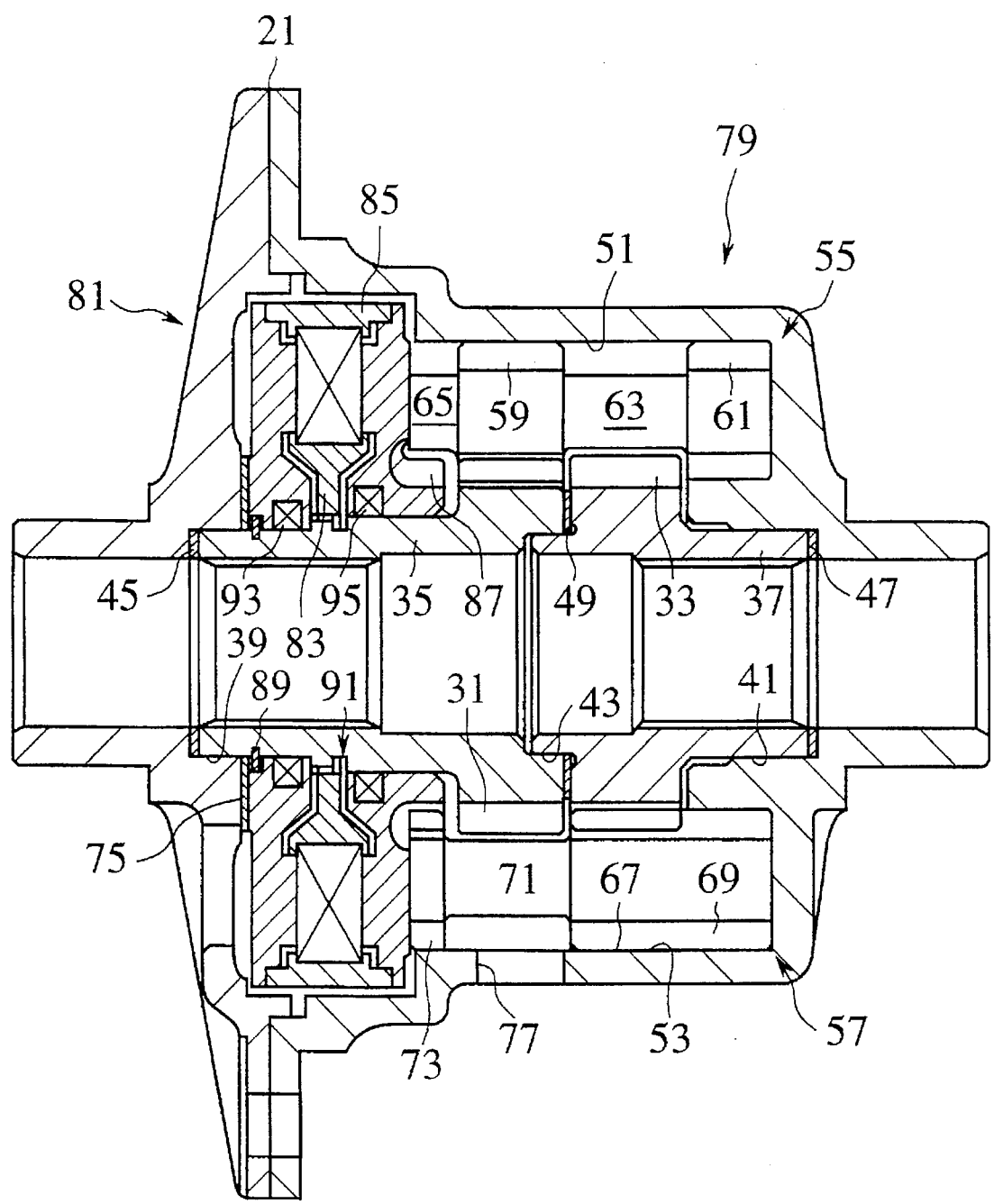
FIG. 4 is a sectional view of the first embodiment of the present invention.
Figure 8:
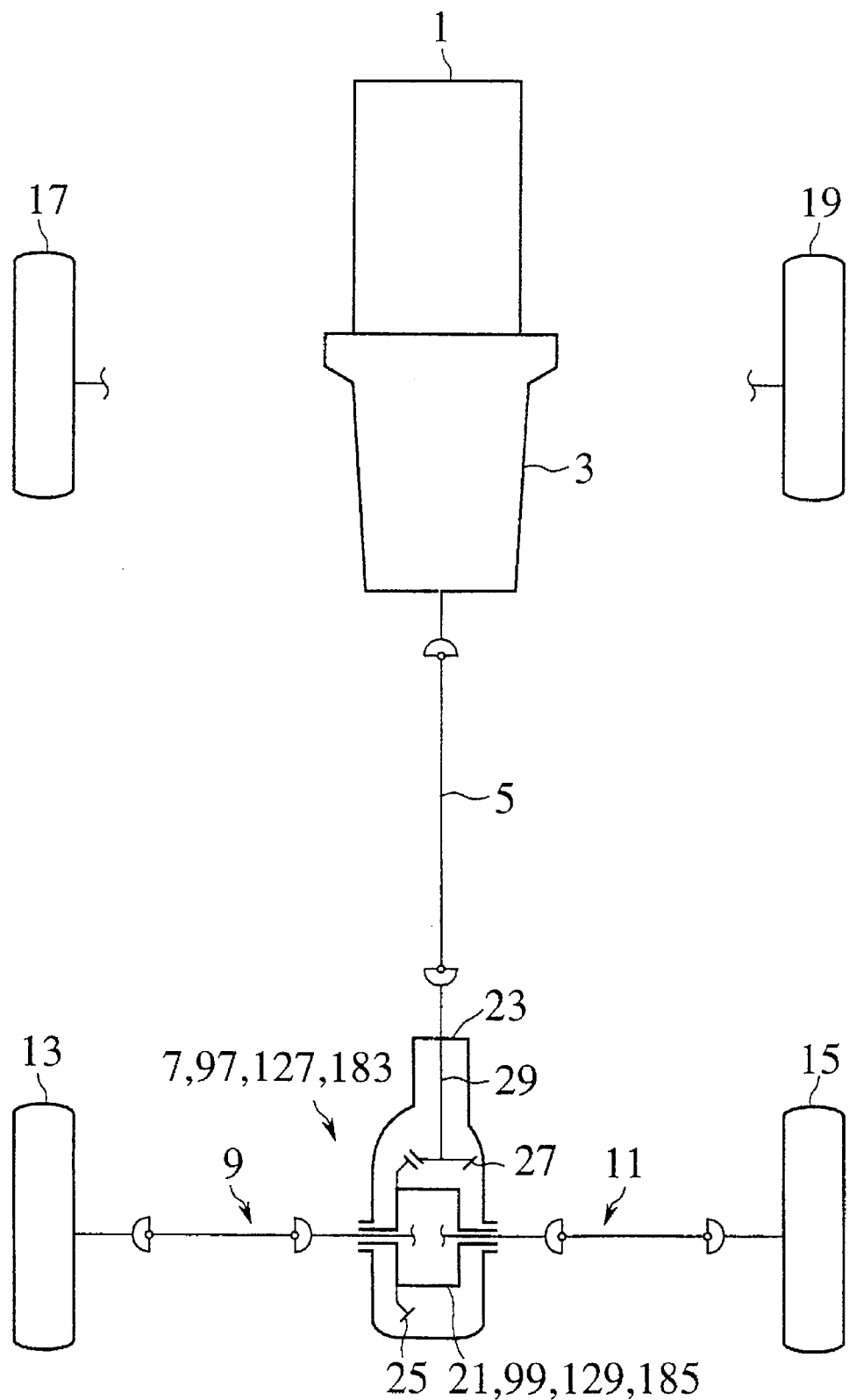
FIG. 8 is a view of a skeleton mechanism showing the power system of vehicles using each embodiment.

The first embodiment of the present invention will now be described with reference to FIGS. 4 and 8. As described below, this embodiment has the features described in claims 2, 5 and 8. FIG. 4 shows the differential gear of this embodiment, and FIG. 8 shows the power system using each embodiment. The right and left direction is the right and left direction in this vehicle and FIG. 4.

Refering to FIG. 8, this power system comprises an engine 1, a transmission 3, a propeller shaft 5, a rear differential gear 7 (differential gear of FIG. 4 disposed on the rear wheels), rear shafts 9 and 11, rear wheels 13, 15 on right and left, front wheels 17, 19 on right and left, and the like.

The differential gear case 21 of the rear differential gear 7 is disposed rotatably in the differential gear carrier 23, a ring gear 25 is fixed to the differential gear case 21. The ring gear 25 is meshed with a driving pinion gear 27 which is integrally formed with a driving pinion shaft 29 coupled on the propeller shaft 5.

Thus, the driving force of the engine 1 rotates and drives the differential gear case 21 via the transmission 3 and the propeller shaft 5. An oil cup is formed in the differential gear carrier 23.

As shown in FIG. 4, in the inside of the differential gear case 21, right and left helical side gears 31 and 33 are disposed. Respective side gears 31 and 33 are formed on the hubs 35 and 37, respectively, and the left end portion and the right end portion of respective hubs are supported by the differential gear case 21, respectively, via the shaft-supporting portions 39 and 41 formed between the differential gear case 21 and the respective hubs, and these hubs are supported by each other via a shaft-supporting portion 43 formed therebetween, being centered. Respective side gears 31 and 33 are spline-coupled with the rear wheels 9 and 11, respectively, via hubs 35 and 37. Between hubs 35, 37 and the differential gear case 21, there are disposed thrust washers 45 and 47, and between hubs 35 and 37, there is disposed a thrust washer 49.

Housing holes 51 and 53 are formed in the axial direction in the differential gear case 21, and these holes are formed in a plurality of pairs at an equal interval in the peripheral direction. In these housing holes 51 and 53, the first and the second helical pinion gears 55 and 57 are respectively housed slidably and rotatably.

The first pinion gear 55 comprises the first and the second gear portions 59 and 61, a shaft portion 63 coupling these gear portions, and a convex portion 65 formed on the left side of the first gear portion 59, the first gear portion 59 being meshed with the side gear 31 on the left. The second pinion gear 57 comprises the first and the second gear portions 67 and 69, a shaft portion 71 formed on the left side of the first gear portion 67, and a spur gear 73 (mesh portion). The first gear portion 67 is meshed with the right side gear 33, and the second gear portion 69 is meshed with the second gear portion 61 of the pinion gear 55.

Thus, respective side gears 31 and 33 are supported by the mesh with the pinion gears 55 and 57 arranged on the peripheryoutside in the radial direction.

The pinion gear 55 has a wide interval between the gear portions 59 and 61 by means of the shaft portion 63, and the pinion gear 57 has a wide interval between the gear portions 67, 69 and the spur gear 73 because of the formation of the shaft portion 71 and the spur gear 73, thereby either of them is supported in a wide span by the housing holes 51 and 53 to be prevented from falling down toward the axial direction.

The oil in the oil cup flows into the differential gear case 21 from the openings 75 and 77 to lubricate the sliding portion of the inside and the mesh portions of the gears.

The driving force of the engine i for rotating the differential gear case 21 is distributed to the rear wheels 13 and 15 on left and right via the pinion gears 55 and 57 through the side gears 31 and 33. And when there is caused a difference in the driving resistance between rear wheels, the driving force of the engine 1 is differentially distributed to the right and left sides by the rotation of the pinion gears 55 and 57.

Thus, the differential mechanism 79 is constituted.

On the left side of the differential mechanism 79, a coupling 81 (a limit slip differential of the speed-responsive type) which restricts the differential movement in response to the differential rotation speed. The hub 83 (the member of the one side) of this coupling 81 is spline-coupled with the hub 35 of the left side gear 31. Furthermore, the housing 85 (the member on the other side) is meshed with the spur gear 73 of the pinion gear 57 at the spur gear portion 87 (mesh portion) formed on the right end side, and positioned inthe axial direction by the snap ring 89 mounted to the hub 35 and the stepped portion 91 of the hub 35. The housing 85 is also supported rotatably on the periphery of the hub 35, seals 93 and 95 are disposed therebetween.

As described above, the coupling 81 is coupled to the side gears 31 and 33 via the pinion gear 57, and arranged in S-S.

During the transmission of the torque, the pinion gears 55 and 57 are pushed to the wall face of the housing holes 51 and 53 by the reaction force in the action with the side gears 31 and 33 to cause the friction resistance. Furthermore, the friction resistance is caused between the pinion gears 55 and 57 and the differential gear case 21, and the housing 85 by the acting thrust force of the helical gear, and the friction resistance is caused between the side gears 31 and 33 and the washer 45, 47 and 49, and the differential gear case 21. The differential movement of the differential mechanism 79 is restricted by these friction resistance.

The friction resistance increases with the increase of the transmission torque, therefore the differential restriction function is the torque-responsive type, and since this differential restriction function works between the side gears 31 and 33, it is the S-S type.

Thus, the rear differential gear 7 is constituted.

In the vehicle in FIG. 8, the stability in going straight is improved by the differential restriction function of the torque-responsive type at the time of start or acceleration when large torque is imposed on the rear wheels 13 and 15, and when one of the rear wheels 13 and 15 runs idle due to a bad state of the road, a driving force is transmitted to the rear wheel on the grip side by the speed-responsive type differential restriction function of the coupling 81 to improve the traveling performance.

As described above, since the differential restriction functions of the speed-responsive type and the torque-respnsive type are both arranged in S-S, even if any one of the rear wheels 13 and 15 runs idle, or regardless of the revolution direction of the wheel, uniform differential restriction property can be obtained to improve the stability of the body and the operability. Moreover, differing from the conventional differential gear 301, there is no need to make the length of the shafts 9 and 11 unequal in order to arrange the coupling 81 in S-S.

Furthermore, if the mesh portion of the housing 85 and the pinion gear 57 is a helical gear, it can be possible to make the torque-responsive type differential restriction function non-uniform. This is an advantageous property when the differential gear is disposed between the front wheels and the rear wheels of the four-wheel drive car.

In addition, all of the side gears 31 and 33, the gear portions 59 and 61 of the pinion gear 55, and the gear portions 67 and 69 of the pinion gear 57 are formed straight in the axial direction, and there is no stepped portion, thereby the production cost is cheap, the assembly is easy and the man-hour for the assembly can be reduced.

Furthermore, by meshing the hub 35 of the side gear 31 with the hub 83 of the coupling 81, there is no need to form a stepped portion 333, as in the conventional embodiment, in the hub 83, therefore, the materialization of the rear differential gear is improved in assembling the coupling 81, the differential gear can be made widely adaptable to different kinds of vehicles.

Figure 5:
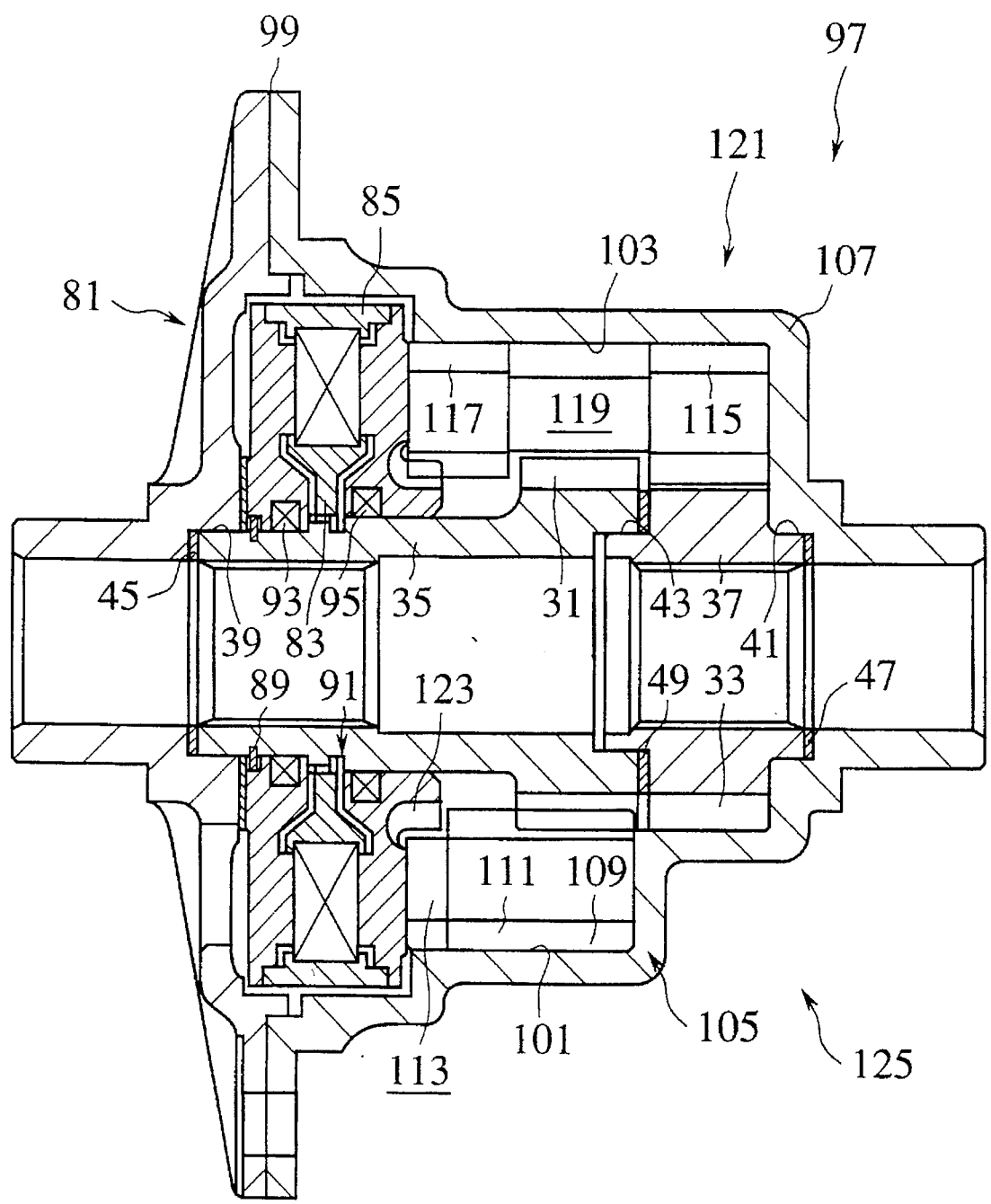
FIG. 5 is a sectional view of the second embodiment of the present invention.

Next, the second embodiment of the present invention will be described with reference to FIGS. 5 and 8. As described below, this embodiment has the features described in claims 2, 6 and 8. FIG. 5 shows the differential gear of this embodiment, and this differential gear is used as the rear differential gear 97 of FIG. 8. Incidentally, in FIG. 5 and in the following description, same reference numerals are given to the members having the same function as in the above embodiment (rear differential gear 7). The right and left direction is the right and left direction in this vehicle and FIG. 5.

As shown in FIG. 5, in the differential gear case 99, housing holes 101 and 103 are formed in the axial direction, and they are formed in a plurality of pairs at an equal interval in the peripheral direction. In these housing holes 101 and 103, the first and the second helical pinion gears 105 and 107 are respectively housed slidably and rotatably.

The first pinion gear 105 comprises the first and the second gear portions 109 and 111, and a convex portion 113 formed on the left side of the second gear portion 111, the first gear portion 109 being meshed with the side gear 31 on the left. The second pinion gear 107 comprises the first and the second gear portions 115 and 117, and a shaft portion 119 which couples these gear portions. The first gear portion 115 is meshed with the right side gear 33, and the second gear portion 117 is meshed with the second gear portion 111 of the pinion gear 105.

Thus, respective side gears 31 and 33 are supported by the mesh with the pinion gears 105 and 107 arranged on the periphery outside in the radial direction.

The driving force of the engine 1 for rotating the differential gear case 99 is distributed to the rear wheels 13 and 15 on left and right via the pinion gears 105 and 107 through the side gears 31 and 33. And when there is caused a difference in the driving resistance between rear wheels, the driving force of the engine 1 is differentially distributed to the right and left sides by the rotation of the pinion gears 105 and 107.

Thus, the differential mechanism 121 is constituted.

On the left side of the differential mechanism 121, a coupling 81 (a limit slip differential of the speed-responsive type), and the left-end side of the second gear portion 117 of the pinion gear 107 is meshed with the mesh portion 123 formed in the housing 85 of the coupling 81. Thus, the coupling 81 is coupled to the side gears 31 and 33 via the pinion gear 107 and arranged in S-S.

During the transmission of the torque, the acting reaction force imposed to the pinion gears 105 and 107 and the acting thrust force imposed to the pinion gears 105 and 107 and the side gears 31 and 33 cause the friction resistance. And as in the case of the rear differential gear 7 of the above embodiment, the torque-responsive type differential restriction function of the S-S type which works between side gears 31 and 33 is obtained.

Thus, the rear differential gear 97 is constituted.

In the vehicle in FIG. 8, the stability in going straight is improved by the differential restriction function of the torque-responsive type at the time of start or acceleration when large torque is imposed on the rear wheels 13 and 15, and when one of the rear wheels 13 and 15 runs idle due to a bad state of the road, a driving force is transmitted to the rear wheel on the grip side by the speed-responsive type differential restriction function of the coupling 81 to improve the traveling performance.

Since the differential restriction functions of the speed-responsive type and the torque-respnsive type are both arranged in S-S, even if any one of the rear wheels 13 and 15 runs idle, or regardless of the revolution direction of the wheel, uniform differential restriction property can be obtained to improve the stability of the body and the operability. Moreover, differing from the conventional differential gear 301, there is no need to make the length of the shafts 9 and 11 unequal in order to arrange the coupling 81 in S-S.

Moreover, in the rear differential gear 97, since the second gear portion 117 of the pinion gear 107 is utilized for the mesh of the coupling 81 and the housing 85, the other pinion gear 105 can be made short, as well as avoiding waste of the differential gear 99 at a point shown by an arrow 125, thereby making the rear differential gear 97 lightweight is made possible.

In addition, all of the side gears 31 and 33, the gear portions 109 and 111 of the pinion gear 105, and the gear portions 115 and 117 of the pinion gear 107 are formed straight in the axial direction, and there is no stepped portion, thereby the production cost is cheap, the assembly is easy and the man-hour for the assembly can be reduced.

Furthermore, as in the rear differential gear 7, there is no need to form a stepped portion 333, as in the conventional embodiment, in the hub 83, therefore, the materialization of the rear differential gear 97 is improved, and the differential gear can be made widely adaptable to different kinds of vehicles.

Figure 6:
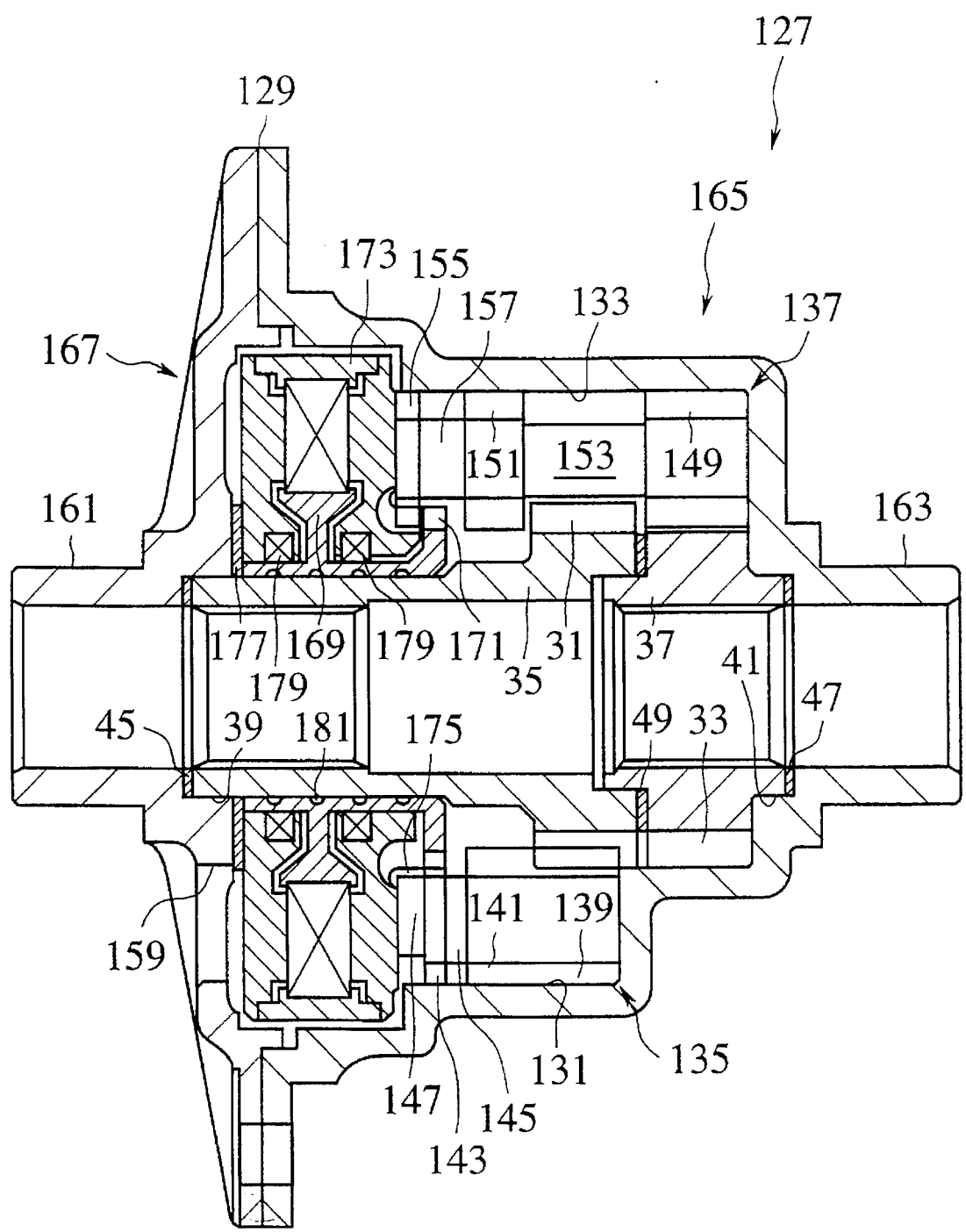
FIG. 6 is a sectional view of the third embodiment of the present invention.

Next, the third embodiment of the present invention will be described with reference to FIGS. 6 and 8. As described below, this embodiment has the features described in claims 3, 4, 5 and 8. FIG. 6 shows the differential gear of this embodiment, and this differential gear is used as the rear differential gear 127 of the vehicle in FIG. 8. Incidentally, in FIG. 6 and in the following description, same reference numerals are given to the members having the same function as in the above embodiment (rear differential gear 7). The right and left direction is the right and left direction in this vehicle and FIG. 6.

In the differential gear case 129, housing holes 131 and 133 are formed in the axial direction, and they are formed in a plurality of pairs at an equal interval in the peripheral direction. In these housing holes 131 and 133, the first and the second helical pinion gears 135 and 137 are respectively housed slidably and rotatably.

The first pinion gear 135 comprises the first and the second gear portions 139 and 141, a spur gear 143 (mesh portion), a shaft portion which couples the spur gear 143 and the second gear portion 141, and a convex portion 147 formed on the left side of the spur gear 143, the first gear portion 139 being meshed with the side gear 31 on the left. The second pinion gear 137 comprises the first and the second gear portions 149 and 151, a shaft portion 153 which couples these gears, a spur gear 155 (mesh portion), and a shaft portion 157 which couples the spur gear 155 and the second gear portion 151, the first gear portion 149 being meshed with the right side gear 33 and the second gear portion 151 being meshed with the second gear portion 141 of the pinion gear 135.

Thus, respective side gears 31 and 33 are supported by the mesh with the pinion gears 135 and 137 arranged on the periphery outside in the radial direction.

The pinion gear 135 has a wide interval between the gear portions 139 and 141 by means of the shaft portion 145, and the pinion gear 137 has a wide interval between the gear portion 149 and the spur gear 155 because of the formation of the shaft portion 153, 157 and the spur gear 155, thereby either of them is supported in a wide span by the housing holes 131 and 133 to be prevented from falling down toward the axial direction.

The oil flows into the differential gear case 129 from the oil cup in the pinion carrier 23 through the opening 159 and the helical oil groove provided on the inner periphery of the boss portions 161 and 163 to lubricate the sliding portion of the inside and the mesh portions of the gears.

The driving force of the engine 1 for rotating the differential gear case 129 is distributed to the rear wheels 13 and 15 on left and right via the pinion gears 135 and 137 through the side gears 31 and 33. And when there is caused a difference in the driving resistance between rear wheels, the driving force of the engine 1 is differentially distributed to the right and left sides by the rotation of the pinion gears 135 and 137.

Thus, the differential mechanism 165 is constituted.

On the left side of the differential mechanism 165, a coupling 167 (a limit slip differential of the speed-responsive type) is disposed. The hub 169 (the member of the one side) of this coupling 167 is meshed with the spur gear 143 of the pinion gear 135 at the spur gear portion 171 formed on the right-end side, and the housing 173 (the member on the other side) is meshed with the spur gear 155 of the pinion gear 137 at the spur gear portion 175 formed on the left side of the spur gear portion 171. Between the housing 173 and the differential gear case 129, there is disposed a thrust washer 177 which receives the acting thrust force of the pinion gears 135 and 137.

The housing 173 is rotatably supported on the periphery of the hub 167, and seals 179 and 179 having the same diameter aredisposed therebetween. Furthermore, the hub 167 is rotatably supported on the periphery of the hub 35 of the side gear 31, and a helical oil groove 181 is formed on the inner periphery of the hub 161. The oil flown into the inside of the differential gear case 129 lubricates the sliding portion with the hub 35 by means of the rotation of the oil groove 181, as well as sending oil to the mesh portions of the thrust washer 177, the spur gear portions 171 and 175, the spur gears 143 and 155.

As described above, the coupling 167 is coupled to the one side gear 31 via the pinion gear 135, and arranged in S-S by coupling the housing 173 to the other side gear 33 via the other pinion gear 137.

During the transmission of the torque, the pinion gears 135 and 137 are pushed to the wall face of the housing holes 131 and 133 by the reaction force in the action with the side gears 31 and 33 to cause the friction resistance. Furthermore, the friction resistance is caused between the pinion gears 135 and 137 and the differential gear case 129, and the housing 173 by the acting thrust force of the helical gear, and the friction resistance is caused between the side gears 31 and 33 and the differential gear case 129, and between the side gears 31 and 33 via the thrust washer 49.

The torque-responsive type differential restriction function of the S-S type is obtained which works between the side gears 31 and 33.

Thus, the rear differential gear 127 is constituted.

In the vehicle in FIG. 8, the stability in going straight is improved by the differential restriction function of the torque-responsive type at the time of start or acceleration when large torque is imposed on the rear wheels 13 and 15, and when one of the rear wheels 13 and 15 runs idle due to a bad state of the road, a driving force is transmitted to the rear wheel on the grip side by the speed-responsive type differential restriction function of the coupling 167 to improve the traveling performance.

Since the differential restriction functions of the speed-responsive type and the torque-respnsive type are both arranged in S-S, even if any one of the rear wheels 13 and 15 runs idle, or regardless of the revolution direction of the wheel, uniform differential restriction property can be obtained to improve the stability of the body and the operability. Moreover, differing from the conventional differential gear 301, there is no need to make the length of the shafts 9 and 11 unequal in order to arrange the coupling 167 in S-S.

Furthermore, mesh portions (spur gear portions 171 and 175) with the pinion gears 135 and 137 are provided on both of the hub 169 and the housing 173 of the coupling 167 to unitize the coupling 167, thereby the assembly to the differential mechanism 165 is facilitated and the man-hour for the assembly can be reduced.

Furthermore, by unitizing the coupling 167, it becomes possible to make the seals 179 and 179 have the same diameter, and the cost is reduced by making them common.

In addition, all of the side gears 31 and 33, the gear portions 139 and 141 of the pinion gear 135, the gear portions 149 and 151 of the pinion gear 137, and the spur gear 155 are formed straight in the axial direction, and there is no stepped portion, thereby the production cost is cheap, the assembly is easy and the man-hour for the assembly can be reduced.

Figure 7:
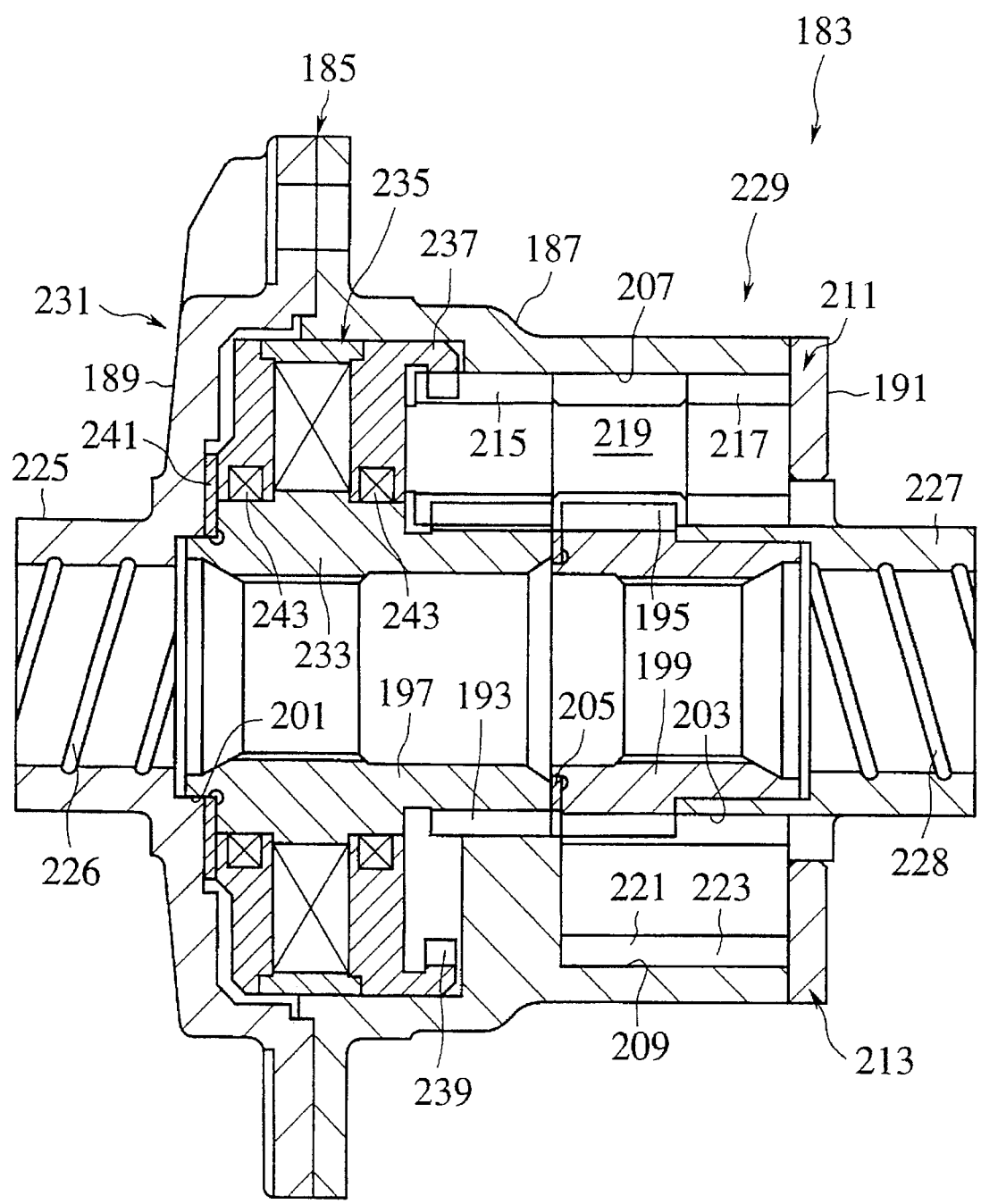
FIG. 7 is a sectional view of the fourth embodiment of the present invention.

Next, the fourth embodiment of the present invention will be described with reference to FIGS. 7 and 8. As described below, this embodiment has the features described in claims 1, 7 and 8. FIG. 7 shows the differential gear of this embodiment, and this differential gear is used as the rear differential gear 183 of the vehicle in FIG. 8. Incidentally, the right and left direction is the right and left direction in this vehicle and FIG. 7.

The differential gear case 185 is so constituted that the differential gear case body 187, the cover 189 and the plate 191 to prevent from coming out are fixed by bolts. In the inside of the differential gear case 185, left and right helical side gears 193 and 195 are disposed.

Respective side gears 193 and 195 are formed respectively on the hubs 197 and 199, and the left-end portion and the right-end portion of these hubs 197 and 199 are supported to the differential gear case 185 via the shaft portions 201 and 203 fromed between the differential gear case 185 and these hubs. Respective side gears 193 and 195 are spline-coupled to the rear wheels 9 and 11, respectively, via the hubs 197 and 199. A thrust washer 205 is disposed between the hubs 197 and 199.

In the differential gear case 185, housing holes 207 and 209 are formed in the axial direction and in a plurality of pairs at an equal interval in the peripheral direction. In these housing holes 207 and 209, the first and the second helical pinion gears 211 and 213 are respectively housed slidably and rotatably.

The first pinion gear 211 comprises the first and the second gear portions 215 and 217, and the shaft portion 219 to couple these gear portions, the first gear portion 215 being meshed with the side gear 193 on the left (side gear on the one side). The second pinion gear 213 comprises the first and the second gear portions 221 and 223. The first gear portion 221 is meshed with the right side gear 195, and the second gear portion 223 is meshed with the second gear portion 217 of the pinion gear 211.

Thus, respective side gears 193 and 195 are supported by the mesh with the pinion gears 211 and 213 arranged on the periphery outside in the radial direction.

In the differential gear case 183, there is provided an opening, and helical oil grooves 226 and 228 are provided on the inner periphery of The boss portions 225 and 227. The oil flows into the differential gear case 183 from the oil cup in the pinion carrier 23 through these oil grooves and the opening to lubricate the sliding portion and the mesh portions of the gears.

The driving force of the engine 1 for rotating the differential gear case 183 is distributed to the rear wheels 13 and 15 on left and right via the pinion gears 211 and 213 through the side gears 193 and 195. And when there is caused a difference in the driving resistance between rear wheels, the driving force of the engine 1 is differentially distributed to the right and left sides by the rotation of the pinion gears 211 and 213.

Thus, the differential mechanism 229 is constituted.

On the left side of the differential mechanism 229, a coupling 231 (a limit slip differential of the speed-responsive type) is disposed. And the hub 233 (member on the one side) of this coupling 231 is integrally formed with the hub 197 of the left side gear 193. Furthermore, a spread portion 237 is provided on the right side of the housing 235 (member on the other side), and an internal gear 239 is formed in the spread portion 237. The housing 235 is meshed with the left-end portion of the first gear portion 215 of the pinion gear 211 by the internal gear 239. Between the housing 235 and the differential gear case 183, a thrust washer 241 which receives the acting thrust force of the pinion gear 211 is disposed.

The housing 235 is rotatably supported on the periphery of the hub 233, and seals 243 and 243 having the same diameter are disposed therebetween.

Thus, the coupling 231 is arranged in S-S, and works between the side gears 193 and 195 via the pinion gear 211.

During the transmission of the torque, the pinion gears 211 and 213 are pushed to the wall face of the housing holes 207 and 209 by the reaction force in the action with the side gears 193 and 195 to cause the friction resistance. Furthermore, if respective gears 193, 195, 211 and 213 of the differential mechanism are constitutued by helical gears, the friction resistance is caused between the pinion gears 211 and 213 and the differential gear case 185, and the housing 235 by the acting thrust force of the helical gear, and the friction resistance is caused between the side gear 193 and the differential gear case 185, and between the side gear 195 and the differential gear case 185, and between the side gears 193 and 195 via the thrust washer 205.

The torque-responsive type differential restriction function of the S-S type is obtained which works between the side gears 193 and 195.

Thus, the rear differential gear 183 is constituted.

In the vehicle in FIG. 8, the stability in going straight is improved by the differential restriction function of the torque-responsive type at the time of start or acceleration when large torque is imposed on the rear wheels 13 and 15, and when one of the rear wheels 13 and 15 runs idle due to a bad state of the road, a driving force is transmitted to the rear wheel on the grip side by the speed-responsive type differential restriction function of the coupling 81 to improve the traveling performance.

Since the differential restriction functions of the speed-responsive type and the torque-respnsive type are both arranged in S-S, even if any one of the rear wheels 13 and 15 runs idle, or regardless of the revolution direction of the wheel, uniform differential restriction property can be obtained to improve the stability of the body and the operability. Moreover, differing from the conventional differential gear 301, there is no need to make the length of the shafts 9 and 11 unequal in order to arrange the coupling 231 in S-S.

Moreover, by forming the hub 233 of the coupling 231 integrally with the hub 197 of the side gear 193, and by providing an internal gear 239 in the housing 235 to be meshed with the pinion gear 211, the coupling 231 including the side gear 193 is unitized, thereby the assembly to the differential mechanism 229 is facilitated and the man-hour for the assembly can be reduced.

Furthermore, by forming the hub 233 integrally with the side gear 193, it is made possible to make seals 243 and 243 have the same diameter, and the cost is reduced by making them common.

In addition, all of the side gears 193 and 195, the gear portions 215, 217, 221 and 223 of the pinion gears 211 and 213, are formed straight in the axial direction, and there is no stepped portion, thereby the production cost is cheap, the assembly is easy and the man-hour for the assembly can be reduced.

Furthermore, in the rear differential gear 183, since the first gear portion 215 of the pinion gear 211 is used for the mesh with the coupling 231, there is no need to form a gear portion separately to couple with the coupling 231, therefore the pinion gear 211 has a simple shape, and consequently has a low cost.

Furthermore, by forming the hub 233 of the coupling 231 integrally with the hub 197 of the side gear 193, there is no need to form a stepped portion 333, as in the conventional embodiment, therefore, the materialization of the rear differential gear 183 is improved in incorporating the coupling 231, and the differential gear can be made widely adaptable to different kinds of vehicles.

The present invention has been described with reference to various rear differential gears, but the differential gear of the present invention is not restricted to the rear differential gear, but is used for a front differential gear (a shaft differential gear on the front wheel side) and a center differential gear (a differential gear which distributes the driving force to the front wheels and the rear wheels).

The differential gears of each claim obtain the torque-responsive type differential restriction function of the S-S type by the friction resistance caused by the acting reaction force of each gear and the acting thrust force of the helical gears, while having the speed-responsive type differential restriction function of the S-S type by coupling the speed-responsive type differential restriction mechanism to both side gears via the pinion gears, therefore uniform differential restriction property can be obtained by combining the differential restriction functions of both the torque-responsive type and the speed-responsive type.

Furthermore, by using the pinion gear to couple the speed-responsive type limit slip differential with the side gears on both sides, there is no need to make the length of the shaft unequal in order to arrange the speed-responsive type limit slip differential in S-S, differing from the differential gear 301 of the conventional embodiment.

In the differential gear of claim 3, by providing the mesh portion with gears, respectively, on both of the member on the one side and the member on the other side of the speed-responsive type differential restriction mechanism, the speed-responsive type differential restriction mechanism is unitized to facilitate the assembly to the differential mechanism portion and reduce the man-hour for the assembly.

In the differential gear of claim 7, by forming the member on one side of the speed-responsive type limit slip differential integrally with the side gear on one side, and forming the internal gear on the member on the other side of the speed-responsive type limit slip differential to be meshed with the pinion gear on the side gear on the other side, the speed-responsive type limit slip differential as well as the side gear on the other side are unitized to facilitate the assembly to the differential mechanism, as in the structure according to claim 3, and reduce the cost. In addition, it becomes possible to make a pair of seals have the same diameter, which are used for the speed-responsive type limit slip differential, and by making them common, the cost can be further reduced.

Furthermore, by using the differential mechanism with the structure which couples the side gear with the pinion gear arranged in the axial direction, it becomes possible to make each gear as well as the coupling portions with the speed-responsive type limit slip differential in a straight form, not in a stepped form, while arranging the limit slip differential of the torque-responsive type and the speed-responsive type in S-S, as described above, which reduces the production cost of the pinion gears and the side gears, as well as facilitating the assembly thereof and reducing the man-hour for the assembly.

What is claimed is:

1. A differential gear comprising:
   a differential gear case rotated and driven by a driving force of an engine;
   pinion gears housed slidably and rotatably in housing holes formed in the differential gear case;
   a pair of side gears on wheels coupled via the pinion gears; and
   a limit slip differential of the speed-responsive type coupled to these side gears via the pinion gears.

2. A differential gear comprising:
   a differential gear case rotated and driven by a driving force of an engine;
   first and second pinion gears housed slidably and rotatably in housing holes formed in said differential gear case, said first and second pinion gears meshing with each other;
   a pair of side gears on wheels coupled via said first and second pinion gears; and
   a speed-responsive typed limit slip differential including a member, on one side of said limit slip differential, coupled to one of said pair of side gears, and a member on an other side of said limit slip differential meshing with the other of said pair of side gears and connected to one of said pinion gears.

3. A differential gear comprising:
   a differential gear case rotated and driven by a driving force of an engine;
   first and second pinion gears housed slidably and rotatably in housing holes formed in said differential gear case, said first and second pinion gears meshing with each other;
   a pair of side gears on wheels coupled via said first and second pinion gears; and
   a speed-responsive type limit slip differential including a member, on one side of said limit slip differential, meshing with said first pinion gear and a member, on another side of said limit slip differential, meshing with said second pinion gear.

4. A differential gear according to claim 2, wherein the member on the other side is arranged on the outside in the radial direction of the member on one side, and a mesh portion for engagement with the member on the other side is formed on the pinion gear.

5. A differential gear according to claim 4, wherein the mesh portion is a spur gear.

6. A differential gear according to claim 2, wherein the member on the other side is arranged on the outside in the radial direction of the member on one side, and the second pinion gear meshes directly with the mesh portion of the member on the other side.

7. A differential gear according to claim 1, wherein said speed-responsive type limit slip differential includes a member, on one side of said limit slip differential, formed integrally with one of said pair of side gears, and an internal gear provided on a member on another side of said limit slip differential meshing with one of said pinion gears meshing with said one of said pair of side gears.

8. A differential gear according to claim 1, wherein the side gears and the pinion gears are composed of helical gears.

9. A differential gear according to claim 2, wherein said first and second pinion gears mesh directly with each other.

10. A differential gear according to claim 2, wherein said first and second pinion gears mesh with each other via an idle gear.

11. A differential gear according to claim 3, wherein said first and second pinion gears mesh directly with each other.

12. A differential gear according to claim 3, wherein said first and second pinion gears mesh with each other via an idle gear.

13. A differential gear comprising:
    a differential gear case rotated by a driving force of an engine, said differential gear case being provided with housing holes;
    first and second pinion gears accommodated in said housing holes for frictional rotational engagement therewith, said first and second gears meshing with each other;
    a pair of side gears associated with each other through said first and second pinion gears; and
    a limit slip differential associated with said side gears, wherein a differential restriction ability of said limit slip differential is responsive to a rotating speed of said limit slip differential.

14. A differential gear according to claim 13, wherein said limit slip differential comprises:
    a member on one side connected with one of said pair of side gears; and
    a member on another side connected with said second pinion gear meshing with the other of said pair of side gears.

15. A differential gear according to claim 14, wherein said member on another side is arranged radially outside of said member on one side, said differential gear further comprising a mesh portion formed on said second pinion gear, said mesh portion being in mesh with said member on another side.

16. A differential gear according to claim 15, wherein said mesh portion comprises a spur gear.

17. A differential gear according to claim 14, wherein said member on one side is formed integrally with said one of said pair of side gears; and
    wherein an internal gear is provided on said member on another side, said internal gear meshing with said first pinion gear, and said first pinion gear meshing with said one of said pair of side gears.

18. A differential gear according to claim 13, wherein said limit slip differential comprises a member on one side meshing with said first pinion gear and a member on another side meshing with said second pinion gear.

19. A differential gear according to claim 13, wherein said side gears and said pinion gears are helical gears.

* * * * *